(12) United States Patent
Shi et al.

(10) Patent No.: US 8,917,687 B2
(45) Date of Patent: Dec. 23, 2014

(54) METHOD, APPARATUS AND SYSTEM FOR SENDING AND RECEIVING SOUNDING REFERENCE SIGNAL

(75) Inventors: Zhihua Shi, Beijing (CN); Jianjun Liu, Beijing (CN); Qixing Wang, Beijing (CN); Xiaodong Xu, Beijing (CN); Guangyi Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 178 days.

(21) Appl. No.: 13/641,884

(22) PCT Filed: Apr. 20, 2011

(86) PCT No.: PCT/CN2011/073053
§ 371 (c)(1),
(2), (4) Date: Oct. 18, 2012

(87) PCT Pub. No.: WO2011/131127
PCT Pub. Date: Oct. 27, 2011

(65) Prior Publication Data
US 2013/0039319 A1    Feb. 14, 2013

(30) Foreign Application Priority Data

Apr. 20, 2010   (CN) .......................... 2010 1 0153770
May 12, 2010   (CN) .......................... 2010 1 0175328

(51) Int. Cl.
*H04W 4/00*   (2009.01)
*G01R 31/08*   (2006.01)
(Continued)

(52) U.S. Cl.
CPC .............. *H04L 5/0023* (2013.01); *H04L 5/005* (2013.01); *H04L 27/2613* (2013.01)
USPC ........... 370/329; 370/252; 370/328; 370/332

(58) Field of Classification Search
None
See application file for complete search history.

(56) References Cited

U.S. PATENT DOCUMENTS 8,077,593 B2   12/2011   Iwai et al.
8,077,594 B2   12/2011   Iwai et al.
(Continued)

FOREIGN PATENT DOCUMENTS

CN   101500242 A   8/2009
CN   101540631 A   9/2009
(Continued)

OTHER PUBLICATIONS

International Search Report (in Chinese with English translation) for PCT/CN2011/073053, mailed Jul. 28, 2011.
(Continued)

*Primary Examiner* — Faruk Hamza
*Assistant Examiner* — Diane Lo
(74) *Attorney, Agent, or Firm* — Harness, Dickey & Pierce, P.L.C.

(57) ABSTRACT

A method, an apparatus and a system for sending Sounding Reference Signal (SRS) and a method, an apparatus and a system for receiving SRS are disclosed in the present invention, which are used to reduce the requirement for Time Frequency Code (TFC) resource during the process of sending the SRS, and meanwhile to ensure the precision of channel information estimation. The method includes the steps of: determining a first frequency band required by sending the SRS, and determining a second frequency band whose width is smaller than the width of the first frequency band; according to the mode that the average interval for sending the SRS on the first frequency band is larger than the average interval for sending the SRS on the second frequency band, respectively sending the SRS on the first frequency band and the second frequency band.

17 Claims, 5 Drawing Sheets

Determine a first frequency band for sending an SRS and determine a second frequency band which has a bandwidth less than that of the first frequency band  — 11

Send the SRS on each of the first frequency band and the second frequency band in a manner that the average interval for sending the SRS on the first frequency band is greater than the average interval for sending the SRS on the second frequency band  — 12

(51) Int. Cl.
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 5/00* (2006.01)
*H04L 27/26* (2006.01)

(56) References Cited

U.S. PATENT DOCUMENTS

| | | | |
|---|---|---|---|
| 2008/0232240 A1 | 9/2008 | Baum et al. | |
| 2009/0028112 A1* | 1/2009 | Attar et al. | 370/332 |
| 2009/0034468 A1* | 2/2009 | Muharemovic et al. | 370/330 |
| 2009/0279447 A1* | 11/2009 | Mehta et al. | 370/252 |
| 2011/0142095 A1* | 6/2011 | Guo et al. | 375/133 |
| 2012/0057495 A1 | 3/2012 | Iwai et al. | |
| 2012/0120826 A1 | 5/2012 | Hao et al. | |
| 2013/0003659 A1 | 1/2013 | Iwai et al. | |

FOREIGN PATENT DOCUMENTS

| | | |
|---|---|---|
| CN | 101547022 A | 9/2009 |
| CN | 101594633 A | 12/2009 |
| EP | 2426831 A1 | 3/2012 |
| WO | WO-2009019879 A1 | 2/2009 |
| WO | WO-2009023825 A2 | 2/2009 |

OTHER PUBLICATIONS

First Chinese Office Action regarding Application No. 201010175328.9, dated Feb. 27, 2013. English translation provided by Unitalen Attorneys at Law.

First Chinese Office Action regarding Application No. 201010153770.1, dated Mar. 26, 2013. Translation provided by Unitalen Attorneys at Law.

* cited by examiner

METHOD, APPARATUS AND SYSTEM FOR SENDING AND RECEIVING SOUNDING REFERENCE SIGNAL

CROSS REFERENCE TO RELATED APPLICATIONS

The present application is the national phase of International Application No. PCT/CN2011/073053, titled "METHOD, APPARATUS AND SYSTEM FOR SENDING AND RECEIVING SOUNDING REFERENCE SIGNAL", filed on Apr. 20, 2011, which claims the benefit of priority to Chinese patent application No. 201010153770.1 titled "METHOD, APPARATUS AND SYSTEM FOR SENDING AND RECEIVING SOUNDING REFERENCE SIGNAL", filed with the Chinese State Intellectual Property Office on Apr. 20, 2010, and the benefit of priority to Chinese patent application No. 201010175328.9 titled "METHOD AND APPARATUS FOR SENDING AND RECEIVING SOUNDING REFERENCE SIGNAL", filed with the Chinese State Intellectual Property Office on May 12, 2010. The entire disclosure thereof is incorporated herein by reference.

FIELD OF THE INVENTION

The invention relates to the field of communication technology, and in particular to a method, an apparatus and a system for sending and receiving a Sounding Reference Signal (SRS).

BACKGROUND OF THE INVENTION

In a Long Term Evolution (LTE) system, in order to achieve uplink frequency-domain scheduling, in addition to send a demodulation reference signal on the data transmission frequency band of the User Equipment (UE) itself, the UE also needs to send a sounding reference signal SRS on a frequency band which has a bandwidth greater than that of the data transmission frequency band, so as to perform sounding on the channel, thereby realizing the purpose of assisting the base station to allocate the uplink transmission resource to the UE.

By utilizing the SRS and the channel reciprocity, it is easy to implement a series of complex multi-antenna technologies, such as SU-MIMO/Beamforming, MU-MIMO/Beamforming, SU-CoMP and MU-CoMP, in the LTE system, so that multiple transmitting antennas may be supported at the UE side. For example, in an LTE-A system, the UE can send the SRS by using multiple transmitting antennas (typically the number of the transmitting antennas is 2 or 4, etc.), and therefore the system is required to allocate more SRS Time Frequency Code (TFC) resource to transmit SRS. In addition, in the LTE-A system, the allocation of the uplink transmission resource for the UE supports a cluster-based allocation. According to the cluster-based allocation, the uplink resource may be allocated to sub-bands far away from each other. Therefore, in order to support the user scheduling and the uplink precoding, the UE needs to send an SRS on a wider frequency band to perform sounding on the channel. This will further increase the requirement for SRS time frequency code resource, which will in turn lead to the significant increase of the uplink overhead and reduce the efficiency of the uplink transmission spectrum.

In the prior art, the requirement for the time frequency code resource in certain time period for sending the SRS can be reduced in a manner of extending the period for sending the SRS. However, the extension of the sending period will bring the problem of lower precision of channel information estimation.

SUMMARY OF THE INVENTION

According to embodiments of the invention, there is provided a method, an apparatus and a system for sending a sounding reference signal as well as a method, an apparatus and a system for receiving a sounding reference signal, which can reduce the requirement for time frequency code recourse during the process of sending the SRS, and meanwhile ensure the precision of channel information estimation.

The embodiments of the invention adopt the following technical solutions:

A method for sending a sounding reference signal, including: determining a first frequency band required for sending the sounding reference signal and determining a second frequency band which has a bandwidth less than that of the first frequency band; and sending the sounding reference signal on each of the first frequency band and the second frequency band in a manner that the average interval for sending the sounding reference signal on the first frequency band is greater than the average interval for sending the sounding reference signal on the second frequency band.

A method for receiving a sounding reference signal, including: determining a first frequency band required for sending the sounding reference signal and determining a second frequency band which has a bandwidth less than that of the first frequency band; monitoring the sounding reference signal on each of the determined first frequency band and the determined second frequency band, with the average interval for sending the sounding reference signal on the first frequency band being greater than the average interval for sending the sounding reference signal on the second frequency band; and receiving the sounding reference signal on the monitored frequency bands.

An apparatus for sending a sounding reference signal, including: a frequency band determining unit, configured to determine a first frequency band required for sending the sounding reference signal and determine a second frequency band which has a bandwidth less than that of the first frequency band; a sending unit, configured to send the sounding reference signal on each of the first frequency band and the second frequency band that are determined by the frequency band determining unit, in a manner that the average interval for sending the sounding reference signal on the first frequency band is greater than the average interval for sending the sounding reference signal on the second frequency band.

An apparatus for receiving a sounding reference signal, including a frequency band determining unit, configured to determine a first frequency band required for sending the sounding reference signal and determine a second frequency band which has a bandwidth less than that of the first frequency band; a monitoring unit, configured to monitor the sounding reference signal on each of the first frequency band and the second frequency band that are determined by the frequency band determining unit, with the average interval for sending the sounding reference signal on the first frequency band being greater than the average interval for sending the sounding reference signal on the second frequency band; and a receiving unit, configured to receive the sounding reference signal on the frequency bands that are monitored by the monitoring unit.

A system for sending a sounding reference signal, including a network side device and a user equipment, wherein:

the network side device is configured to determine a first frequency band required for sending the sounding reference signal by the user equipment and determine a second frequency band which has a bandwidth less than that of the first frequency band; and the user equipment is configured to send the sounding reference signal on each of the first frequency band and the second frequency band that are determined by the network side device, in a manner that the average interval for sending the sounding reference signal on the first frequency band is greater than the average interval for sending the sounding reference signal on the second frequency band.

A system for receiving a sounding reference signal, including a network side device and a user equipment, wherein the network side device is configured to determine a first frequency band required for sending the sounding reference signal by the user equipment, determine a second frequency band which has a bandwidth less than that of the first frequency band, monitor the sounding reference signal on each of the determined first frequency band and the determined second frequency band, and receive the sounding reference signal on the monitored frequency bands; the user equipment is configured to send the sounding reference signal on each of the first frequency band and the second frequency band that are determined by the network side device, in a manner that the average interval for sending the sounding reference signal on the first frequency band is greater than the average interval for sending the sounding reference signal on the second frequency band.

The beneficial effect achieved by the embodiments of the invention is as follows:

According to the solution provided in the embodiments of the invention, by determining the first frequency band required when the SRS is sent and determining the second frequency band which has a bandwidth less than that of the first frequency band and sending the SRS on each of the first frequency band and the second frequency band in a manner that the average interval for sending the SRS on the first frequency band is greater than the average interval for sending the SRS on the second frequency band, the requirement for the time frequency code resource can be reduced since the SRS is sent on the first frequency band at a larger interval, and meanwhile the precision of channel information estimation can be ensured since the SRS is sent on the second frequency band at a smaller interval.

DETAILED DESCRIPTION OF THE INVENTION

An embodiment of the invention provides a method for sending an SRS and a method for receiving an SRS, which can reduce the requirement for the time frequency code resource by sending the SRS on a wider first frequency band at a lower sending frequency, and meanwhile ensure the precision of channel information estimation by sending the SRS on a narrower second frequency band at a higher sending frequency.

Figure 1:
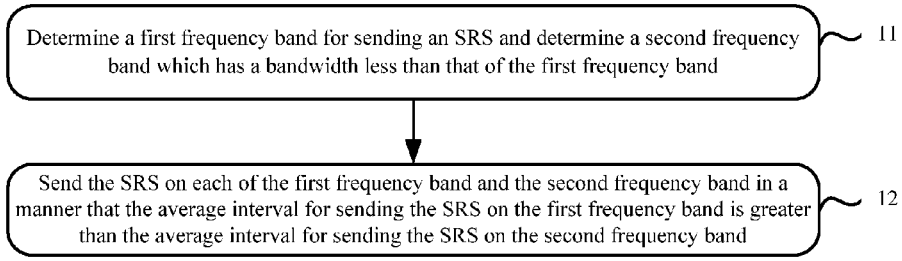
FIG. 1 is a schematic flowchart of a method for sending an SRS according to an embodiment of the invention.

Specifically, the embodiment of the invention firstly provides a method for sending an SRS, the specific flowchart of which is shown in FIG. 1. The method includes the following steps:

Step 11, determining a first frequency band for sending the SRS and determining a second frequency band which has a bandwidth less than that of the first frequency band.

The frequency range contained by the first frequency band can completely cover the frequency range contained by the second frequency band, or the frequency range contained by the first frequency band only partially overlaps with the frequency range contained by the second frequency band, or the frequency range contained by the first frequency band does not overlap with the frequency range contained by the second frequency band. Generally, only one second frequency band is determined, i.e. two SRS transmission frequency bands with different sizes, namely one first frequency band and one second frequency band, are determined. Alternatively, more than one second frequency band may be determined. In the embodiment of the invention, for convenient description, in the following illustration is only made with respect to the situation that one the first frequency band and one second frequency band are determined.

Step 12, sending the SRS on each of the first frequency band and the second frequency band in a manner that the average interval for sending the SRS on the first frequency band is greater than the average interval for sending the SRS on the second frequency band.

When the SRS is sent on a wider first frequency band at a larger average interval, the following effects are achieved: providing channel information for the uplink multi-user scheduling in a communication system, obtaining multi-user diversity gain, and reducing the requirement for time frequency code resource. When the SRS is sent on a narrower second frequency band at a smaller average interval, since the second frequency band is narrower, the SRS that is sent based on the second frequency band has a relatively high signal-to-noise ratio, more accurate channel information can be obtained, so as to improve the precision of channel information estimation, which compensates for the precision of the channel information estimation damaged when the SRS is sent on the wider first frequency band at the larger average interval. Therefore, the solution provided in the embodiment of the invention can reduce the requirement for time frequency code resource by sending the SRS on the first frequency band with wider bandwidth at a lower sending frequency, and meanwhile ensure the precision of channel information estimation by sending the SRS on the second frequency band with narrower bandwidth at a higher sending frequency.

In the embodiment of the invention, the SRS can be sent at a determined sending period, or the SRS can be sent when information for notifying the sending of the SRS is received. In the following, different situations for the sending of the SRS are described:

In the first situation, the SRS is periodically sent on each of the first frequency band and the second frequency band.

Figure 2:
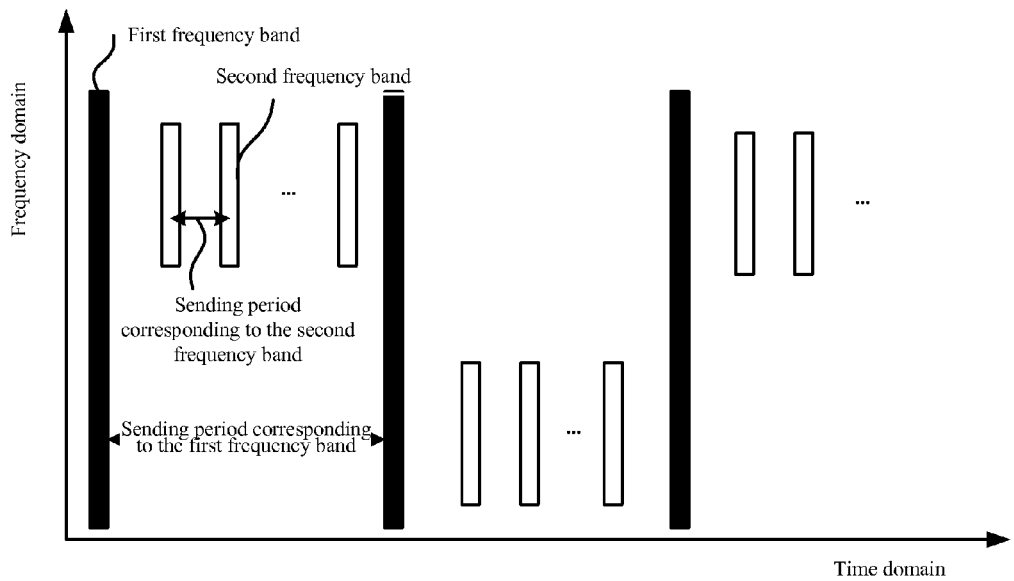
FIG. 2 is a schematic diagram in which the SRS is sent periodically by using the method according to an embodiment of the invention.

For the first situation, the above solution provided in the embodiment of the invention can further include: determining sending periods corresponding respectively to the first frequency band and the second frequency band in a manner that a frequency band having a larger bandwidth corresponds to a larger sending period and a frequency band having a smaller bandwidth corresponds to a smaller sending period, so that when the SRS is sent on each of the first frequency band and the second frequency band, depending on the determined sending periods that correspond to different sending frequency bands, the SRS can be sent on either of the frequency bands corresponding to the sending period at a time point indicated by the sending period. The sending of the SRS according to the first situation is schematically shown in FIG. 2. It can be seen from FIG. 2 that the period for sending the SRS on the first frequency band is set to be longer, while the period for sending the SRS on the second frequency band is set to be shorter.

In the second situation, neither of the sending of the SRS on the first frequency band or the second frequency band is periodic.

For the second situation, in the above solution provided in the embodiment of the invention, the SRS can be sent on a corresponding frequency band after information for notifying to send the SRS on the first frequency band or the second frequency band is received, where it should be ensured that the interval for receiving the information for notifying to send the SRS on the first frequency band is greater than the interval for receiving the information for notifying to send the SRS on the second frequency band.

In the third situation, the sending of the SRS on specified one of the determined frequency bands is periodic while the sending of the SRS on the other one of the determined frequency bands is not periodic.

For example, it is feasible to set the period for sending the SRS on the first frequency band so that the SRS is sent on the first frequency band according to the period while the SRS is sent on the second frequency band when the information for notifying to send the SRS on the second frequency band is received.

Alternatively, it is also feasible to set the period for sending the SRS on the second frequency band so that the SRS is sent on the second frequency band according to the period while the SRS is sent on the first frequency band when the information for notifying to send the SRS on the first frequency band is received.

Furthermore, considering that the time period for sending the SRS on the first frequency band may be overlapped with the time period for sending the SRS on the second frequency band, in the embodiment of the invention, sending the SRS on each of the first frequency band and the second frequency band includes:

determining whether there exists overlap between the time period over which the SRS is to be sent on the first frequency band and the time period over which the SRS is to be sent on the second frequency band; determining the overlapped time period if there exists the overlap; sending, within the overlapped time period, the SRS only on the first frequency band, or sending, within the overlapped time period, the SRS which is originally to be sent on the second frequency band within the overlapped time period, on the first frequency band in a manner of multiplexing the first frequency band.

Furthermore, for the consideration to further save the time frequency code resource of the communication system, in the embodiment of the invention, when the size of the second frequency band coincides with the size of data transmission frequency band of an UE (which can be an uplink data transmission frequency band or a downlink data transmission frequency band), the data transmission frequency band of the UE can be multiplexed for sending the SRS which is originally to be sent on the second frequency band.

In the embodiment of the invention, the SRS can also be sent by using a sequence which is used to send a demodulation reference signal. Specifically, when the second frequency band is wider than the data transmission band of the UE, the specific process for sending the SRS on the second frequency band in the method provided in the embodiment of the invention can include:

firstly, determining whether the user equipment is currently sending a demodulation reference signal by using the data transmission frequency band;

sending the SRS in a demodulation reference signal sequence on a position which is used for sending the demodulation reference signal or on a specified position in the demodulation reference signal sequence, if the user equipment is not currently sending the demodulation reference signal by using the data transmission frequency band;

extending the length of the demodulation reference signal sequence so as to cover the second frequency band, encoding the SRS in a manner of code division multiple access or frequency division multiple access or time division multiple access, and sending the encoded SRS in the extended demodulation reference signal sequence, if the user equipment is currently sending the demodulation reference signal by using the data transmission frequency band.

Through a further research on the prior art, it is found that, generally, a precoding matrix is configured only for the SRS that assists the uplink transmission, which, however, is not suitable for encoding the SRS for assisting the downlink transmission. Therefore, if the SRS for assisting the downlink transmission is encoded by using the precoding matrix which is configured for the SRS for assisting the uplink transmission, the channel response estimation value that is obtained by a base station based on the SRS for assisting the downlink transmission will be not accurate enough. It may be seen that with the solution of the prior art, the uplink transmission and the downlink transmission with better performance can not be achieved at the same time in the communication system. Accordingly, in the embodiment of the invention, it is considered to configure a precoding matrix for the SRS for assisting the uplink transmission and meanwhile configure another precoding matrix for the SRS for assisting the downlink transmission, so that the SRS for assisting the uplink transmission and the SRS for assisting the downlink transmission can be encoded by using different precoding matrices, rather than encoded by using the same precoding matrix, thus achieving the reduce of the time frequency code resource required during the process of sending the SRS and meanwhile contributing to achieve an uplink transmission and a downlink transmission with better performance in the communication system.

Specifically, for the purpose of assisting to achieve the uplink transmission and the downlink transmission with better performance in the communication system, the method provided in the embodiment of the invention as shown in FIG. 1 can further include steps of: determining a first precoding matrix which is used to encode the SRS for assisting the uplink transmission and a second precoding matrix which is used to encode the SRS for assisting the downlink transmission; and encoding the SRS with each of the first precoding matrix and the second precoding matrix, so as to obtain a first SRS and a second SRS. On the basis of the above steps, the specific implementation of the step 12 can include: sending the first SRS on the first frequency band and sending the second SRS on the second frequency band, in a manner that the average interval for sending the SRS on the first frequency band is greater than the average interval for sending the SRS on the second frequency band. Preferably, in the embodiment of the invention, the first SRS and the second SRS can be sent in a manner of time division multiplexing or frequency division multiplexing or code division multiplexing.

According to the above solution provided in the embodiment of the invention, because the SRS for assisting the uplink transmission and the SRS for assisting the downlink transmission are configured with respective precoding matrices, when the SRS for assisting the downlink transmission is precoded, there is no need to encode the SRS for assisting the uplink transmission and the SRS for assisting the downlink transmission by using the only one precoding matrix. Therefore, in the solution provided in the embodiment of the invention, the time frequency code resource required during the process of sending the SRS can be reduced by encoding the SRS with the precoding matrix, and meanwhile it helps to achieve the uplink transmission and the downlink transmission with better performance in the communication system.

In the embodiment of the invention, the first precoding matrix and the second precoding matrix can be determined in many ways. For example, the user equipment can send an SRS to the base station so that the first precoding matrix and the second precoding matrix can be determined by the base station. Specifically, the user equipment can send a third SRS to the base station, then receive information on the first precoding matrix and information on the second precoding matrix, each of which is determined by the base station according to the third SRS and sent from the base station, and thus respectively determine the first precoding matrix and the second precoding matrix according to the information on the first precoding matrix and the information on the second precoding matrix, where the third SRS generally refers to an SRS which is not subjected to precoding, i.e. a Non-precoded SRS. In addition, the information on the first precoding matrix can include information that can be used to determine the first precoding matrix such as information on the rank of the first precoding matrix; similarly, the information on the second precoding matrix can also include the information on the rank of the second precoding matrix. Alternatively, only the first precoding matrix is determined in the way that the user equipment sends the SRS to the base station, while the second precoding matrix can be determined by the user equipment itself based on the downlink SRS sent by the base station according to a predetermined criterion for determining the second precoding matrix. For example, in order to determine the first precoding matrix and the second precoding matrix, the user equipment can send a third SRS to the base station, receive information on the first precoding matrix which is determined and sent by the base station according to the third SRS, and at the same time receive a downlink SRS sent form the base station; thus the user equipment can determine the first precoding matrix according to the received information on the first precoding matrix, and determine the second precoding matrix according to the received downlink SRS. Alternatively, the user equipment can determine both of the first precoding matrix and the second precoding matrix according to the downlink SRS sent from the base station.

Figure 3:
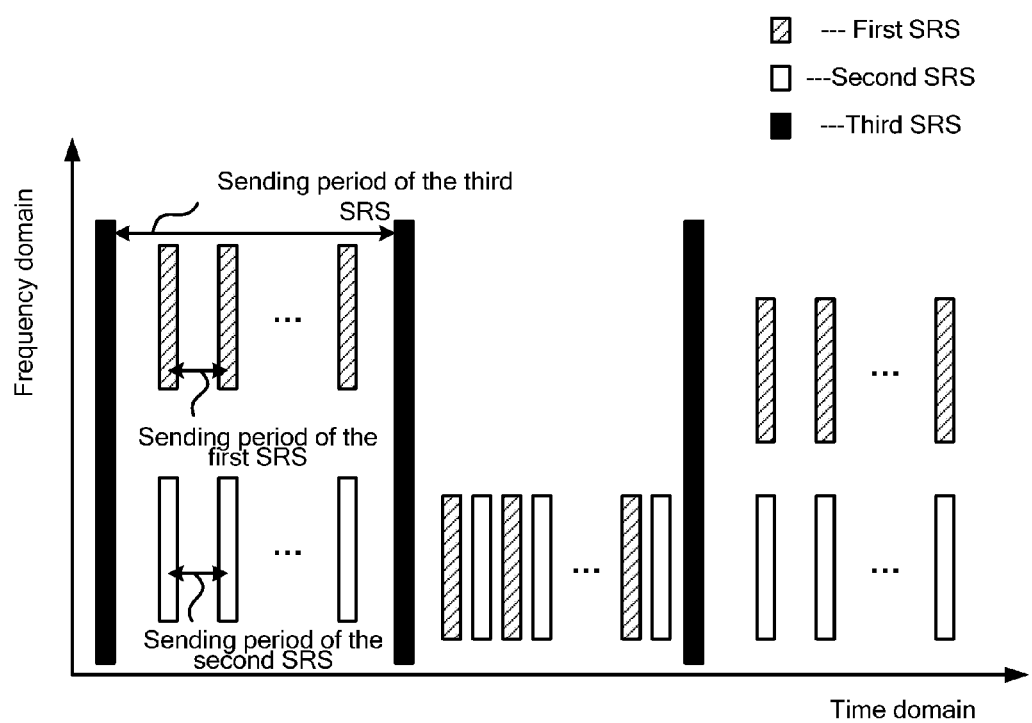
FIG. 3 is a schematic diagram showing one situation of sending a first SRS, a second SRS and a third SRS according to an embodiment of the invention.

In the embodiment of the invention, an average interval for sending the third SRS can be greater than an average interval for sending the first SRS and also greater than an average interval for sending the second SRS, so as to ensure that sending the third SRS does not occupy too much system resources. In addition, the frequency band used for sending the third SRS can contain the first frequency band used for sending the first SRS and the second frequency used for sending the second SRS. Specifically, the case that the third SRS is sent on the third frequency band at a larger average sending interval while the first SRS and the second SRS are sent respectively on the first frequency band and the second frequency band at smaller average sending intervals is schematically shown in FIG. 3. In FIG. 3, the first SRS is indicated by ☒, the second SRS is indicated by ☐, and the third SRS is indicated by ■. In FIG. 3, the first, second and third SRSes are all sent periodically. However, in practice it is possible that only one of the first, second, and third SRSes is periodically sent and the other two are sent to the base station after the user equipment receives a message from the base station notifying to send the SRS. Alternatively, it is possible that two of the first, second and third SRSes are periodically sent and the other is sent to the base station after the user equipment receives the message.

In the embodiment of the invention, the frequency band for sending the third SRS can be divided into two independent frequency bands, namely, for example, a fourth frequency band and a fifth frequency band. The user equipment can send the third SRS on each of the fourth frequency band and the fifth frequency band, where the fourth frequency band can contain the first frequency band for sending the first SRS, and the fifth frequency band can contain the second frequency band for sending the second SRS. It should be noted that the sending of the third SRS on the fourth frequency band and on the fifth frequency band can be independent and non-interference from each other.

When sending the third SRS on each of the fourth frequency band and the fifth frequency band, if overlap with the sending of the first or the second SRS is found, the sending of the pre-coded SRS can be stop temporarily at the overlapped moment. For example, firstly a first moment at which the first SRS and the third SRS are to be sent simultaneously is determined, and a second moment at which the second SRS and the third SRS are to be sent simultaneously is determined; then, when the first SRS is sent on the first frequency band, the sending of the first SRS can be stopped temporarily at the first moment determined and only the third SRS is sent at the first moment; and when the second SRS is sent on the second frequency band, the sending of the second SRS can be stopped temporarily at the second moment determined. As a substitute to the way of temporarily stopping the sending of the SRS, in the embodiment of the invention, the user equipment can transmit the first SRS and the third SRS to the base station on the first frequency band by time division multiplexing or frequency division multiplexing or code division multiplexing; or the user equipment can transmit the second SRS and the third SRS to the base station on the second frequency band by time division multiplexing or frequency division multiplexing or code division multiplexing.

In the following, the specific application of the solution provided in the embodiment of the invention will be described in detail hereinafter with reference to the first embodiment to the fourth embodiment in which the solution is put into practice. The basic idea of these embodiments is that: the process of sending the SRS is composed of three sub-processes, namely a first sub-process, a second sub-process and a third sub-process, where the SRS sent in the first sub-process is used to assist the multi-user scheduling and help to determine the SRS precoding matrices or the rank of the SRS precoding matrices required in the other two sub-processes; the SRS sent in the second sub-process is used to help the adaptive uplink transmission in the system, for example, to determine the precoding matrix required in the adaptive uplink transmission; the SRS sent in the third sub-process is used to help the adaptive downlink transmission in the system, for example, to determine the precoding/beamforming matrices required in the adaptive downlink transmission. For the purpose of reducing the time frequency code resource required in the sending of the SRS, the SRSes sent in the second sub-process and the third sub-process are subjected to corresponding precoding processing before sending. The above three sub-processes cooperate with each other to complete the entire precoding-based SRS transmission. It should be noted that in the embodiment of the invention, the precoding matrices required for the sending of the SRS in the second sub-process and the third sub-process can also be determined by the UE itself (for example, the precoding matrices required in the sending of the SRS for the second sub-process and the third sub-process can be determined according to the downlink SRS sent by the base station). Therefore, it can be known that in practice it is possible to omit the first sub-process from the embodiment of the invention.

The First Embodiment

In the first embodiment, the sending of the SRS contains the following three sub-processes: SRS_0, SRS_UL and SRS_DL. The detailed descriptions of the respective processes are as follows:

SRS_0: In this process, the SRS is sent directly without being encoded with a precoding matrix, therefore, the SRS sent in this process is a non-precoded SRS, and the channel information obtained based on the Non-precoded SRS can be used to help to determine the information on the precoding matrix required in the SRS_UL; in this sub-process SRS_0, the sending of the SRS by the UE can be periodic or non-periodic, or can be performed after the UE receives a notification message sent from the base station which is use for notifying the UE to send the SRS; after the base station receives the Non-precoded SRS sent in the SRS_0, information on the first precoding matrix required when sending the SRS in the sub-process SRS_UL and the information on the second precoding matrix required when sending the SRS in the sub-process SRS_DL can be determined, and the determined information on the first precoding matrix and the second precoding matrix is sent to the UE.

SRS_UL: In this process, in order to reduce the requirement for the system resource in the sending of the SRS, the UE needs to determine the first precoding matrix according to the information on the first precoding matrix which is sent from the base station, encode the SRS with the first precoding matrix and send the encoded SRS; and after the base station receives the encoded SRS sent in the sub-process SRS_UL, the obtained channel information estimated based on the SRS is mainly used for adaptive uplink transmission, such as uplink precoding matrix selection and multi-user scheduling.

SRS_DL: In this process, in order to reduce the requirement for the system resource in the sending of the SRS, the UE also needs to encode the SRS signal by using the second precoding matrix notified by the base station and then send the encoded SRS. In the first embodiment, alternative to being notified by the base station, the information on the precoding matrix required in the SRS_DL process can also be determined by the UE itself. For example, the UE can determine a precoding matrix according to a downlink SRS sent from the base station. It should be noted that the channel information estimated based on the SRS sent in the SRS_DL is mainly used to help the adaptive downlink transmission.

The relevant parameters required in the sending of the SRS in any one of the above sub-processes, such as the periodic or non-periodic sending of the SRS, the period for periodic sending of the SRS, and a single-carrier frequency division multiple access (SC-FDMA) symbol position where the SRS is located, can be configured.

To a certain extent (from the view of the transmission resource), each of the three sub-processes can be considered as a process in which one of three separate "virtual users" sends the SRS; however, the three sub-processes are not necessarily completely independent, but can have a certain association. For example, the SRS transmission band corresponding to the SRS_0 can contain the SRS transmission bands of the other two sub-processes; the information on the precoding matrix (such as the rank of the pre-coded matrix) adopted for the SRS of the SRS_UL and the SRS_DL can be notified by the base station, and the base station normally determines the rank of the precoding matrix by estimating the channel information using the SRS sent in the SRS_0; the precoding matrix adopted for SRS in the SRS_UL can also be determined by the base station through PMI, and the base station can also determine the precoding matrix by estimating the channel information using the SRS sent in the SRS_0; furthermore, as compared with the other two sub-processes, the average sending interval of the SRS in the SRS_0 can be longer, so as to ensure that the sending of the SRS in the SRS_0 process will not occupy too much resources.

According to the above analysis, the SRS transmission of the above three sub-processes can be considered as, to a certain degree, the SRS transmission by three "virtual users", therefore the resource for the SRS transmission in the three sub-processes can be multiplexed through the following ways:

time division multiplexing: the SRS transmission in the three sub-processes occurring on different SC-FDMA symbols;

frequency division multiplexing: the SRS transmission in the SRS_UL sub-process and the SRS_DL sub-process using different sub-carriers, for example, sub-curriries located in different combs, or located in different sub-bands; and code division multiplexing: the SRS transmission in the three sub-processes using different SRS sequences, with the different SRS sequences being orthogonal or quasi-orthogonal.

Furthermore, the SRS can be sent by using a combination of the above three ways. For example, any two of the SRSes in the three sub-processes can be sent based on time division multiplexing/frequency division multiplexing/code division multiplexing.

The Second Embodiment

In the second embodiment, the sending of the SRS can include four sub-processes which are respectively: SRS_0_UL, SRS_0_DL, SRS_UL and SRS_DL, where the SRS_UL sub-process and the SRS_DL sub-process are the same as that in the first embodiment, which will not be described in detail herein. The SRS_0 in the first embodiment is divided into two parts, namely the SRS_0_UL and the SRS_0_DL, which respectively correspond to the SRS_UL sub-process and the SRS_DL sub-process. It should be noted that the process for sending the SRS and the function of the SRS sent in the SRS_0_UL and the SRS_0_DL are similar to that in the first embodiment, with the only difference that the frequency band for sending SRS in the SRS__0_UL needs to only contain the frequency band for sending the SRS in the SRS_UL; meanwhile, the frequency band for sending the SRS in the SRS__0_DL needs to only contain the frequency band for sending the SRS in the SRS_DL.

Similar to the first embodiment, from the view point with respect to the transmission resources, the four sub-processes in the second embodiment can be viewed as the SRS transmission by four "virtual users", and the ways of multiplexing the transmission resources are also similar to that described above, which will not be described herein.

The Third Embodiment

In the third embodiment, the SRS__0 sub-process in the first embodiment can be integrated with the SRS_UL sub-process. For example, in the SRS_UL sub-process, the precoding adopted for the SRSes at certain SC-FDMA symbol positions can be specially selected to implement the Non-precoded SRS transmission, therefore the SRSes at these SC-FDMA symbol positions can be viewed as the Non-precoded SRS that is originally to be sent in the SRS__0. It should be noted that the SC-FDMA symbol for sending the Non-procoded SRS can be selected periodically through the semi-static configuration of the system, or it can be selected in a non-periodic way that the base station signaling the UE to select the SC-FDMA symbol for sending the Non-precoded SRS. For the solution of integrating the SRS__0 sub-process into the SRS_UL sub-process as proposed in the third embodiment, the integration of the SRS__0 and the SRS_UL, in a case that the UE uses two transmitting antennas, can be achieved as following:

--------> Time Domain

..SRS_UL SRS_UL $\left(\begin{bmatrix}0\\1\end{bmatrix}\right)$ SRS_UL SRS_UL SRS_UL $\left(\begin{bmatrix}1\\0\end{bmatrix}\right)$ SRS_UL...

--------> Time Domain

...SRS_UL SRS_UL $\left(\begin{bmatrix}0\\1\end{bmatrix}\right)$ SRS_UL $\left(\begin{bmatrix}1\\0\end{bmatrix}\right)$ SRS_UL SRS_UL SRS_UL ...

Where SRS_UL represents the normal transmission of the SRS_UL sub-process in the first embodiment;

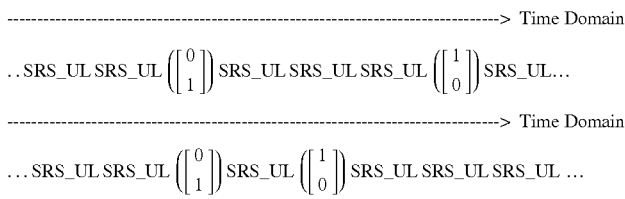

and respectively represent that $$\begin{bmatrix}0\\1\end{bmatrix}$$

and $$\begin{bmatrix}1\\0\end{bmatrix}$$

are used as the precoding matrices for the SRS in the SRS_UL sub-process.

Similarly, the SRS__0 sub-process in the first embodiment can be integrated into the SRS_DL sub-process, or be integrated into both of the SRS_UL sub-process and the SRS_DL sub-process, and the process is similar to of the process for integrating the SRS__0 into the SRS_UL, which will not be described herein.

The Fourth Embodiment

In the fourth embodiment, similar to the process of integrating the SRS__0 into the SRS_UL and the SRS_DL in the third embodiment, the SRS__0_UL sub-process and the SRS__0_DL sub-process in the second embodiment can be integrated into the SRS_UL and the SRS_DL respectively, and the specific implementation process in the fourth embodiment is similar to the implementation process in the third embodiment, which will not be described herein.

Figure 4:
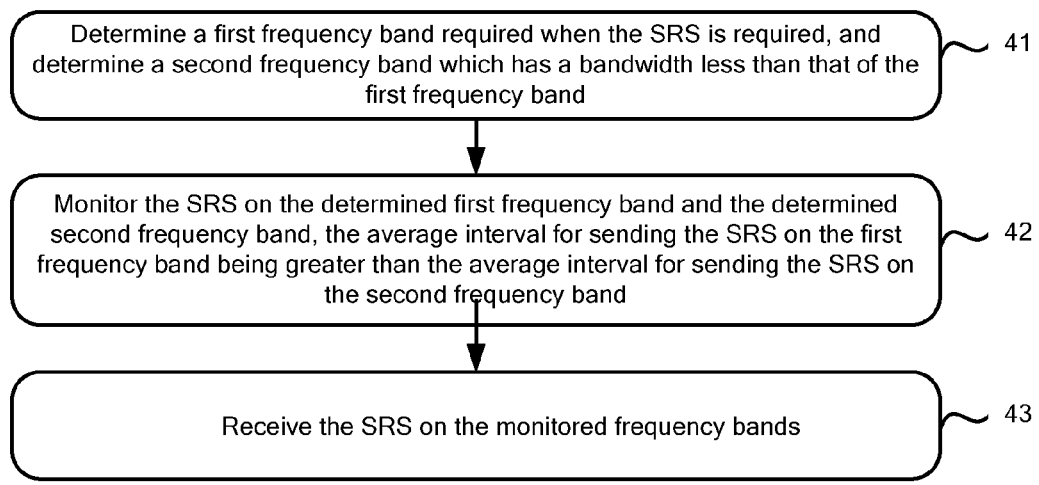
FIG. 4 is a schematic flowchart of a method for receiving an SRS according to an embodiment of the invention.

Accordingly, the embodiment of the invention further provides a method for receiving the SRS as shown in FIG. 4, including steps of:

Step 41, determining a first frequency band required when the SRS is sent, and determining a first frequency band which has a bandwidth less than that of the second frequency band;

Step 42, monitoring the SRS on each of the determined first frequency band and the determined second frequency band, where the average interval for sending the SRS on the first frequency band is greater than the average interval for sending the SRS on the second frequency band; and Step 43, receiving the SRS on the monitored frequency bands.

In a preferred embodiment, the SRSes received on the monitored frequency bands are respectively a first SRS and a second SRS, where the first SRS is obtained by encoding the SRS using a precoding matrix which is used for encoding the SRS for assisting the uplink transmission, and the second SRS is obtained by encoding the SRS using a precoding matrix which is used for encoding the SRS for assisting the downlink transmission.

In the embodiment of the invention, the way for determining the precoding matrix includes, but not limited to:

The First Way:

receiving a third SRS, determining a first precoding matrix according to the third SRS, and sending a downlink SRS and the determined first precoding matrix.

The Second Way:

receiving a third SRS; determining a first precoding matrix and a second precoding matrix according to the third SRS, and sending the determined first precoding matrix and the determined second precoding matrix.

In the following, the flow for implementing the solution provided in the embodiment of the invention will be described in detail by taking the practice of the above solution provided in the embodiment of the invention as an example. In practical application, considering that in the LTE/LTE-A system, the base station desires to obtain the channel information in a larger frequency band so as to obtain a larger uplink multi-user diversity gain, the wider the frequency band of channel for sending the SRS by the UE, the better; on the other hand, in the LTE-A system, since the UE uses multiple transmitting antennas, in order to support advanced MIMO transmission solutions such as precoding, the base station needs to feedback the identification of the precoding matrix/vector (PMI) used in the UE uplink transmission, and since the precoding technology is sensitive to the change in the phase of the channel, in order to obtain better performance, channel estimate with high precision and sounding with a shorter period are required. Starting from the above two considerations, in the embodiment of the invention, one sub-process for sending SRS, in which the SRS sending channel is provided with a wider frequency band and a larger sending period, is used to assist system functions such as user scheduling, and this sub-process can be referred to as a first sub-process; meanwhile another sub-process for sending SRS, in which the SRS sending channel is provided with a narrower frequency band and a smaller sounding interval, can be used to perform the sending of precoded codes or the calculation and selection of beamforming matrix, and this sub-process can be referred to as a second sub-process. The first sub-process and the second sub-process cooperate with each other to complete an entire SRS sending process. It should be noted that the solution provided in the embodiment of the invention is applicable in the FDD system for assisting the adaptive uplink transmission; and is applicable in the TDD system for assisting the adaptive uplink transmission and the adaptive downlink transmission.

In practical applications, for the first sub-process, the UE can be provided with a wider sounding frequency band by the system according to a solution of setting frequency band for the UE that sends SRS with multiple antennas in the prior art, while the base station can estimate channel information by using the SRS, allocate corresponding data transmission resources to the UE, and assist the adaptive uplink and downlink multi-antenna transmission by combing with additional information. In the embodiment of the invention, the first sub-process can also be referred to as a large-band SRS sending process, and accordingly, the second sub-process can also be referred to as a small-band SRS sending process. The large-band SRS sending process can be periodic, or can also be non-periodic. If it is periodic, the SRS sending period in the large-band SRS sending process can be longer than the SRS sending period in the small-band SRS sending process; if it is non-periodic, in the embodiment of the invention, the base station can notify the UE to send the SRS by means of control signaling, where the base station can send the control signaling for one time so that the UE can achieve one or more large-band SRS sending processes.

For the second sub-process above, the UE can be configured with a small frequency band used in a large-band SRS sending process, so as to save transmission resources. For example, the SRS frequency band set in the small-band SRS transmission process can be an actual uplink transmission band of the UE or a frequency band containing the uplink transmission band of the UE (but this frequency band is still less than the frequency band used in the large-band SRS transmission process). If the frequency band set in the small-band SRS sending process is the same as the actual uplink transmission band of the UE, the uplink demodulation signal can be used directly for estimating the channel, thus the sending of the SRS is reduced; if the SRS sending frequency band set in the small-band SRS sending process is greater than the actual uplink transmission band of the UE, there may be three selections:

1. When the UE is sending data, the length of the UE demodulation signal sequence can be increased appropriately to cover the entire small frequency band which needs to be performed with "sounding", so as to achieve the function of the sounding by using the uplink demodulation reference signal sequence;

2. When the UE is not sending data, the UE can be set so that the position which is originally used to send the demodulation reference signal is used for sending the SRS, or if there is no data to be sent by the UE in a long time, it can be considered to stop the sending of the SRS in the small frequency band SRS process, which can save system resources and power consumption of the UE;

3. The SRS is sent at other appropriate positions, for example, the SRS can be sent on a SC-FDMA symbol specified in LTE Rel-8.

In addition, the existing setting of the frequency band for sending the SRS in the LTE system is semi-static, while in the solution provided in the embodiment of the invention, the frequency band in the large-band SRS transmission process can be set semi-statically, while the frequency band in the small-band SRS transmission process can be set dynamically, i.e. the LTE system can configure the frequency band in the small-band SRS transmission process band according to the requirements of the system at any time.

It should be noted that in the above solution provided in the embodiment of the invention the relationship between the large-band SRS transmission process and the small-band SRS transmission process is as follows:

1. The two transmission processes can be carried out independently, the setting of the frequency bands used in the two transmission processes can be regarded as being relatively independent, for example, after the communication system completes the setting of the frequency bands respectively used in the two transmission processes, the UE can send the SRS in parallel according to the respectively set frequency bands;

2. The two transmission processes can cross mutually, for example, if in a small-band SRS transmission process, the UE is set to periodically send the SRS on certain particular SC-FDMA symbols, and a large-band SRS transmission process is also set on such SC-FDMA symbols, thus since the frequency band set for the large-band SRS transmission process is wider than the frequency band set for the small-band SRS transmission process, only the large-band SRS transmission process is required to be carried out, and the small-band SRS transmission process is omitted.

The above solution provided in the embodiment of the invention will be described hereinafter be means of specific embodiments, which mainly illustrates the relationship between the large-band SRS transmission process and the small-band SRS transmission process:

First Embodiment

The frequency band of the communication system is divided into M sub-bands by using N physical resource blocks (PRBs) as a unit, the frequency band in the large-band SRS transmission process can be configured according to the existing LTE Rel-8, and the SRS sending period in the large-band SRS transmission process can be set according to the actual situation of the communication system, or the moment for sending the SRS can be set in a non-periodic manner, i.e. the base station in the communication system can indicate the UE to send the SRS by sending control signaling to the UE. After the UE performs the large band SRS transmission process, the base station estimates the channel information according to the large band SRS transmission process, performs the uplink resource allocation for the UE accordingly together with additional information of the system, and meanwhile it may feedback PMI for assisting the UE to perform precoding transmission, where the uplink resource allocation may be continuous PRB, and may be non-continuous PRBs allocated based on "cluster". The least K sub-bands which can contain the uplink and downlink transmission frequency bands of the UE can be selected, according to the uplink resource allocated to the base station, from the M sub-bands, as the frequency band used by the UE in the small-band SRS transmission process, and thus the UE can implement the small-band SRS transmission process on the selected K sub-bands. In addition, the uplink transmission frequency band of the UE can be directly used as the frequency band used in the small-band SRS transmission process. After the UE completes the small-band SRS transmission process, the base station estimates the channel information according to the small-band SRS transmission process, performs the uplink resource allocation for the UE by combining with additional information of the system, and meanwhile it may feedback PMI to help the UE to perform precoding transmission.

In the this first embodiment, if the SRS sent in the large frequency band SRS transmission process is indicated by SRS1, and the SRS sent in the small frequency band SRS transmission process is indicated by SRS2, when the sending of the SRS in both the large frequency band SRS transmission process and the small frequency band SRS transmission process is periodic, two possible sending sequences of the SRS are as follows:

The first possibility is shown below, in which both the SRS1 and the SRS2 are periodically sent, once a specified times of sending of the SRS2 is completed, the SRS1 is sent for one time, i.e, the SRS1 and the SRS2 are sent in serial:

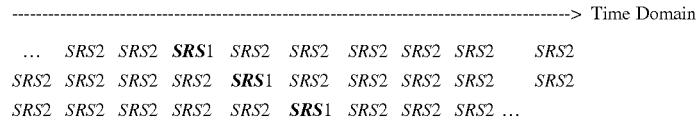

It can be seen from the first possibility that, the interval between the SRS1s is greater than the interval between the SRS2s, i.e. the sending period of the SRS1 is longer than the sending period of the SRS2.

The second possibility is shown below, in which the SRS1 is sent according to the set sending period, and meanwhile the SRS2 is also sent according to its own period, but the sending of the SRS1 and the sending of the SRS2 are relatively independent from each other. The sending of the SRS1 and the SRS2 can be performed in parallel in a way based on code division multiple access or frequency division multiple access or time division multiple access, i.e. the sending of the SRS1 and the SRS2 can be performed by multiplexing the frequency band used in the large frequency band transmission process:

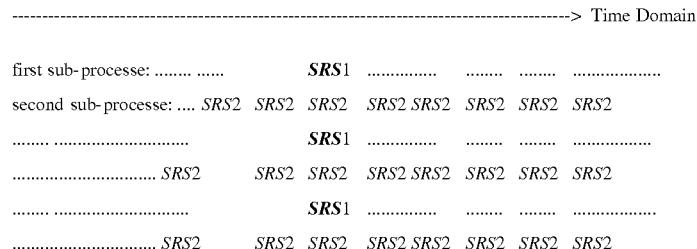

As compared to the situation that both the SRS1 and the SRS2 are sent periodically, when the SRS1 is sent in a non-periodic manner, the following are several possible non-periodic transmission sequences (in the following sequences, X represents the situation that no SRS transmission occurs):

The first possibility is shown below, which represents that the sending of the SRS1 and the SRS2 can be performed alternately:

```
-----------------------------------------------------------------------------------------> Time Domain
... SRS2  SRS2  SRS1  SRS2  SRS2  X     SRS2  SRS2        SRS2  SRS2
SRS1      SRS2  SRS2  SRS2  X     X     SRS2  SRS2        SRS2  SRS2
SRS2      SRS2  SRS2  SRS2  SRS1  SRS2  SRS2  SRS2 ...
```

The second possibility is shown below, which represents that the sending of the SRS1 and the SRS2 can be performed in parallel based on a manner of code division multiple access or frequency division multiple access or time division multiple access, i.e. the sending of the SRS1 and the SRS2 can be performed by multiplexing the frequency band used in the large frequency band transmission process:

```
-----------------------------------------------------------------------------------------> Time Domain
first sub-process: ............... SRS1 ...............................
second sub-process: ... SRS2 SRS2 SRS2 SRS2 X SRS2 SRS2 SRS2 SRS2
........ ..SRS1 ...............................................................
SRS2 SRS2 SRS2 X X SRS2 SRS2 SRS2 SRS2 SRS2 SRS2
........ ..SRS1 ...............................................................
SRS2 SRS2 SRS2 SRS2...............................................................
```

In addition to the above possibilities, it is possible that one of the SRS1 and SRS2 is configured to be sent in a periodic manner and the other is configured to be sent in a non-periodic manner.

Second Embodiment

In the first embodiment above, no matter in a large-band SRS transmission process or a small-band SRS transmission process, the allocated transmission resources are time frequency resources configured by the system that are applicable for transmission. Actually, the frequency band sounded in the small-band SRS transmission process is closely related to the UE data transmission frequency band. Therefore, in the second embodiment, the sounding process is completed by extending the uplink demodulation reference signal.

Similarly, the system frequency band is divided into M sub-bands by using N PRBs as a unit, also the frequency band required in the large-band SRS transmission process can also be configured according to the existing LTE Rel-8, and the specific period of the band SRS transmission process can be determined by the network side device of the communication system based on actual system requirements. Alternatively, the condition for triggering the sending of the SRS in the large-band SRS transmission process can also be set as the control signaling sent by the base station (specifically, the control signaling can be the information that is used to notify the UE to send the SRS as described in the solution according to the embodiment of the invention). After the UE completes the large band SRS transmission process, the base station estimates the channel information according to the large-band SRS transmission process, and meanwhile performs the uplink resource allocation for the user by combing with additional information of the system. In addition, it is possible for the base station to feedback PMI to help the UE to perform precoding transmission. Similar to the first embodiment, here the uplink resource allocation can be continuous PRBs, and can also be non-continuous PRBs allocated based on "cluster". Further, the UE can select, according to the uplink resource allocated by the base station, from M sub-bands, least K sub-bands which can contain the UE uplink transmission frequency band, as the frequency band used by the UE in the small-band SRS transmission process, and then the UE appropriately extends, according to the size of the K sub-bands, the length of the uplink demodulation reference signal sequence, so that the demodulation reference signal can be sent on the K sub-bands (preferably, UE can also directly select PRB so that the frequency band used in the small-band SRS transmission process is the actual uplink transmission frequency band of the UE). After the UE performs the small-band SRS transmission process, the base station estimates, according to the small-band SRS transmission process, the channel information, and meanwhile performs the uplink resource allocation for the UE by combing with additional information of the system. According to the uplink resource allocated to the UE, it is possible to determine the channel sounded by the UE in the small-band SRS transmission process and the sequence and position of the uplink demodulation reference signal. Further, the base station feedbacks, by utilizing the channel information estimated based on the uplink demodulation reference signal, the PMI and similar information to help the UE to perform adaptive transmission.

The solution provided by the second embodiment can effectively reduce the sending of the SRS signal by utilizing the uplink demodulation reference signal, and meanwhile improve the precision of channel information estimation.

The above first and second embodiments are based on the consideration that the sounding process is mainly used to assist the adaptive uplink transmission, which is more suitable for the FDD system. However, in the TDD system, due to the channel reciprocity, the sounding process can also used to help the adaptive downlink transmission of the system. Therefore, for the TDD system, a third embodiment below can be applied:

Third Embodiment

The frequency band of the communication system is divided into M sub-bands by using N PRBs as a unit, the frequency band in the large-band SRS transmission process can be configured according to the existing LTE Rel-8, and the SRS sending period in the large-band SRS transmission process can be set by the communication system according to practical situations, or, the moment for sending the SRS can also be set in a non-periodic manner, i.e. the base station in the communication system indicates the UE to perform the sending of the SRS by sending control signaling to the UE. After the UE completes the large band SRS transmission process, the base station estimates the channel information according to the large-band SRS transmission process, performs the uplink resource allocation for the UE by combining with additional information of the system, and meanwhile may feedback PMI to help the UE to perform precoding transmission, where the uplink resource allocation can be continuous PRBs, and can also be non-continuous PRBs allocated based on "cluster". Further, the least K sub-bands which can contain the uplink and downlink transmission frequency bands of the UE can be selected, according to the uplink resource allocated by the base station, from the M sub-bands, as the frequency band used by the UE in the small-band SRS transmission process, and thus the UE can implement the small-band SRS transmission process on the selected K sub-bands. In addition, the uplink and downlink transmission frequency bands of the UE can be used as the frequency band used in the small-band SRS transmission process. After the UE completes the small-band SRS transmission process, the base station estimates the channel information according to the small-band SRS transmission process, performs the uplink resource allocation for the UE by combining with additional information of the system, and meanwhile may feedback PMI to help the UE to perform precoding transmission. In addition, the estimated channel information can also be used by the base station to perform adaptive uplink transmission.

Figure 5:
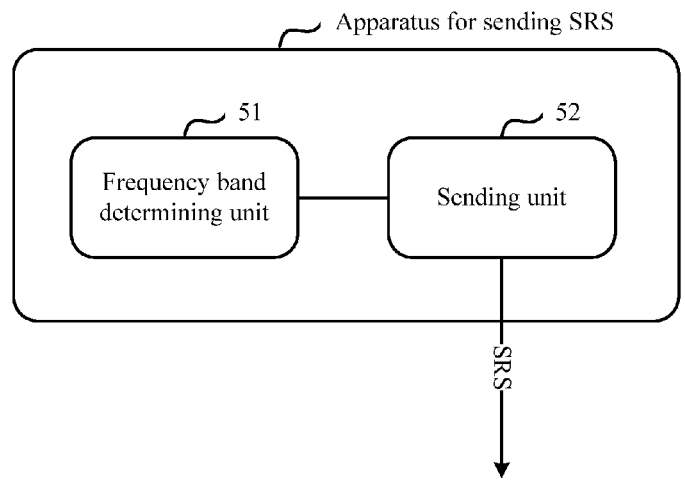
FIG. 5 is a schematic structural diagram of an apparatus for sending an SRS according to an embodiment of the invention.

Corresponding to the method for sending the SRS and the method for receiving the SRS according to the embodiments of the invention, an apparatus for sending the SRS and an apparatus for receiving the SRS are also provided by the present invention. FIG. 5 shows the schematic structural diagram of the apparatus for sending the SRS, including:

a frequency band determining unit 51, configured to determine a first frequency band required when the SRS is sent and determine a second frequency band which has a bandwidth less than that of the first frequency band; and a sending unit 52, configured to send the SRS on each of the first frequency band and the second frequency band, in a manner that the average interval for sending the SRS on the first frequency band is greater than the average interval for sending the SRS on the second frequency band.

Preferably, the apparatus according to the embodiment of the invention can further include a period determining unit configured to determine a first sending period and a second sending period which respectively correspond to the first frequency band and the second frequency band determined by the frequency band determining unit 51 in a manner that a wider frequency band corresponds to a larger sending period while a narrower frequency band corresponds to a smaller sending period.

When the apparatus further includes the period determining unit, the sending unit 52 can be divided into the following function modules: a first sending module, configured to send the SRS on the first frequency band at the first sending period determined by the period determining unit; and a sending module, configured to send the SRS on the second frequency band at the second sending period determined by the period determining unit.

Preferably, the sending unit 52 can be configured to send the SRS according to the received information for notifying to send the SRS on the first frequency band or on the second frequency band. Specifically, the sending unit 52 can be further divided into a receiving module configured to receive information which is used to notify to send the SRS on the first frequency band or on the second frequency band, where the interval for receiving the information which is used to notify to send the SRS on the first frequency band is greater than the interval for receiving the information which is used to notify to send the SRS on the second frequency band; and a sending module, configured to send the SRS on a corresponding band based on the information received by the receiving module.

In addition, the sending unit 52 can also be divided with two additional manners:

When the apparatus further includes the period determining unit for determining the sending period of the first frequency band determined by the frequency band determining unit, the sending unit 52 can be divided into: a sending module, configured to send the SRS on the first frequency band according to the sending period determined by the period determining unit, send the SRS on the second frequency band when the information for notifying to send the SRS on the second frequency band is received, where the sending period is greater than the average interval for receiving this information.

When the apparatus further includes the period determining unit for determining the sending period corresponding to the second frequency band determined by the frequency band determining unit, the sending unit 52 can be divided into: a sending module, configured to send the SRS on the second frequency band according to the sending period determined by the period determining unit, and send the SRS on the first frequency band when the information for notifying to send the SRS on the first frequency band is received, where the sending period is less than the average interval for receiving this information.

Similar to the method embodiment provided in the embodiment of the invention, the time period for sending the SRS on the first frequency band may overlap with the time period for sending the SRS on the second frequency band. In this case, the apparatus according to the embodiment of the invention can only send the SRS on the frequency band, or send multiple SRSes on the first frequency band. In order to realize this function, in the embodiment of the invention, the sending unit 52 can be divided into the following function modules, including:

a decision module, configured to determine whether there exists overlap between the time period over which the SRS is to be sent on the first frequency band and the time period over which the SRS is to be sent on the second frequency band; a determining module configured to determine the overlapped time period if it is determined by the decision module that there exists the overlap; a sending module, configured to send, within the overlapped time period determined by the determining module, the SRS only on the first frequency band in a manner that the average interval for sending the SRS on the first frequency band is greater than the average interval for sending the SRS on the second frequency band; or send, within the overlapped time period, the SRS which is originally to be sent on the second frequency band within the overlapped time period, on the first frequency band in a manner of multiplexing the first frequency band.

Preferably, in the embodiment of the invention, the size of the second frequency band can be configured to be the same as the size of the data transmission frequency band of the user equipment, and in this case, the sending unit 52 can include: a sending module, configured to send the SRS on the first frequency band, and send the SRS which is required to be sent on the second frequency band by multiplexing the data transmission band, where the interval for sending the SRS on the first frequency band is greater than the interval for sending the SRS by multiplexing the data transmission band.

Preferably, in the embodiment of the invention, the second frequency band can be set to be wider than the data transmission band of the user equipment. In this case, the sending unit 52 can include: a decision module, configured to determine whether the user equipment is currently sending a demodulation reference signal by using the data transmission band; a first sending module, configured to, if it is determined by the decision module that the user terminal is not currently sending the demodulation reference signal by using the data transmission frequency band, send the SRS on the first frequency band and send the SRS in a demodulation reference signal sequence on a position which is used to send the demodulation reference signal or on a specified position in the demodulation reference signal sequence, where the average interval for sending the SRS on the first frequency band is greater than the average interval for sending the SRS in the demodulation reference signal sequence; a second sending module, configured to, it is determined by the decision module that the user terminal is currently sending the demodulation reference signal by using the data transmission frequency band, send the SRS on the first frequency band, extend the length of the demodulation reference signal sequence so as to cover the second frequency band, encode the SRS in a manner of code division multiple access or frequency division multiple access or time division multiple access, and send the encoded SRS in the extended demodulation reference signal sequence, where the average interval for sending the SRS on the first frequency band is greater than the average interval for sending the SRS in the demodulation reference signal sequence.

In a preferred embodiment, the apparatus shown in FIG. 5 can further include the following function units, which can reduce the time frequency resources required in the process of sending the SRS, and meanwhile help to achieve the uplink and downlink transmission with better performance in the communication system:

a precoding matrix determining unit, configured to determine a first precoding matrix which is used to encode the SRS for assisting the uplink transmission, and a second precoding matrix which is used to encode the SRS for assisting the downlink transmission; and an encoding unit, configured to encode the SRS with each of the first precoding matrix and the second precoding matrix determined by the precoding matrix determining unit, so as to obtain a first SRS and a second SRS.

On the basis of including the above units, the sending unit 52 in the above apparatus for sending the SRS according to the embodiment of the invention can be specifically configured to: send, on the first frequency band determined by the frequency band determining unit 51, the first SRS obtained by the encoding unit, and send, on the second frequency band determined by the frequency band determining unit 51, the second SRS obtained by the encoding unit, in a manner that the average interval for sending the SRS on the first frequency band is greater than the average interval for sending the SRS on the second frequency band.

Preferably, as a way to implement the function of the precoding matrix determining unit, the precoding matrix determining unit can be further divided into the following function modules, including:

a sending module, configured to send a third sounding reference signal;

a receiving module, configured to receive information on a first precoding matrix which is determined and sent according to the third sounding reference signal sent from sending module, and receive a downlink sounding reference signal; and a determining module, configured to determine a first precoding matrix according to the first precoding matrix information received by the receiving module and determine a second precoding matrix according to the downlink sounding reference signal received by the receiving module.

Alternatively, the precoding matrix determining unit can be divided into the following function modules, including:

a sending module, configured to send a third sounding reference signal;

a receiving module, configured to receive information on the first precoding matrix and information on the second precoding matrix, each of which is determined and sent according to the third sounding reference signal sent from the sending module; and a determining module, configured to determine a first precoding matrix and a second precoding matrix according to the information on the first precoding matrix and the information on the second precoding matrix received by the receiving module.

Preferably, an average interval for sending the third sounding reference signal can be greater than an average interval for sending the first sounding reference signal, and be greater than an average interval for sending the second sounding reference signal, therefore the sending module is specifically configured to send the third sounding reference signal on the third frequency band, where the third frequency band for sending the third sounding reference signal contains the first frequency band for sending the first sounding reference signal and the second frequency band used for sending the second sounding reference signal.

Alternatively, the sending module can also send the third sounding reference signal on each of a fourth frequency band and a fifth frequency band, where the fourth frequency band contains the first frequency band, and the fifth frequency band contains the second frequency band.

Preferably, the apparatus for sending an SRS according to the embodiment of the invention can further include a moment determining unit configured to determine a first moment at which the first sounding reference signal and the third sounding reference signal are to be sent simultaneously, and determine a second moment at which the second sounding reference signal and the third sounding reference signal are to be sent simultaneously.

On the basis of including the moment determining unit, the sending unit 52 can be divided into the following function modules, including: a first sending module, configured to send the first sounding reference signal on the first frequency band in a manner that the average interval for sending the sounding reference signal on the first frequency band is greater than the average interval for sending the sounding reference signal on the second frequency band, and temporarily stop, at the first moment determined by the moment determining unit, the sending of the first sounding reference signal; and a second sending module, configured to send the second sounding reference signal on the second frequency band in a manner that the average interval for sending the sounding reference signal on the first frequency band is greater than the average interval for sending the sounding reference signal on the second frequency band, and temporarily stop, at the second moment determined by the moment determining unit, the sending of the second sounding reference signal.

Figure 6:
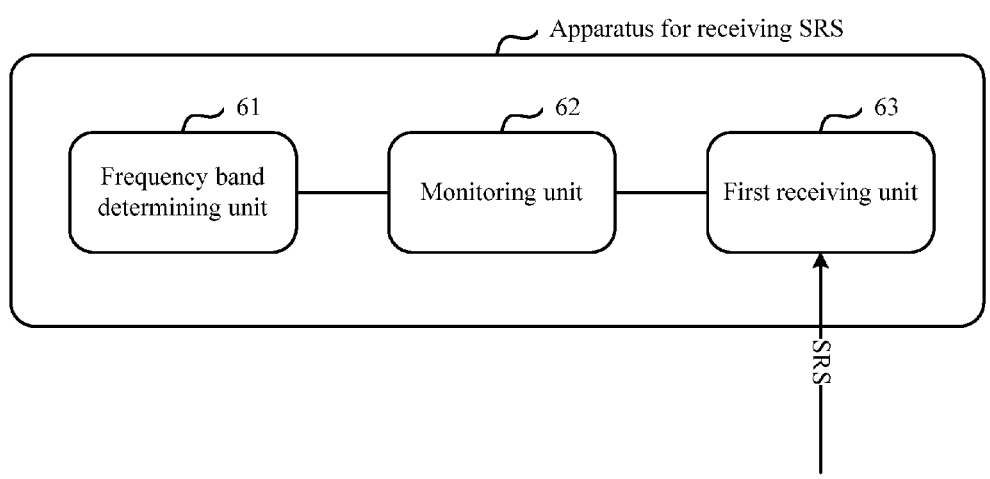
FIG. 6 is a schematic structural diagram of an apparatus for receiving an SRS according to an embodiment of the invention.

Accordingly, the embodiment of the invention also provides an apparatus for receiving an SRS, the specific schematic structural diagram of which is shown in FIG. 6, including: a frequency band determining unit 61, configured to determine a first frequency band required when the SRS is sent, and determine a second frequency band which has a bandwidth less than that of the first frequency band; a monitoring unit 62, configured to monitor the SRS on each of the first frequency band and the second frequency band that are determined by the frequency band determining unit 61, where the average interval for sending the SRS on the first frequency band is greater than the average interval for sending the SRS on the second frequency band; and a first receiving unit 63 configured to receive the SRS on the frequency bands monitored by the monitoring unit 62.

Figure 7:
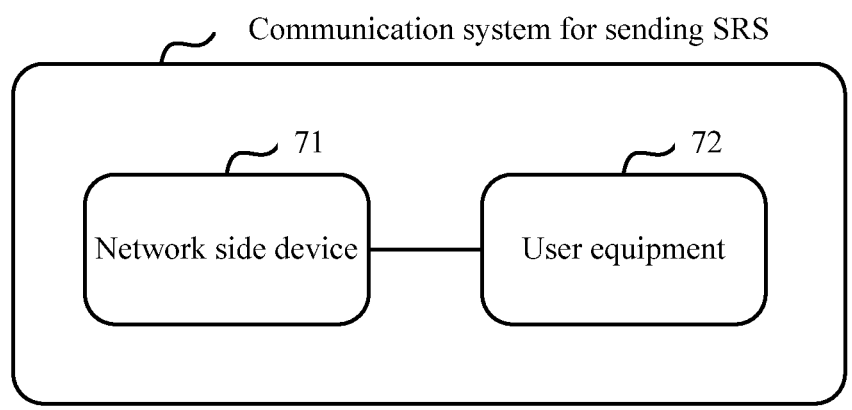
FIG. 7 is a schematic structural diagram of a communication system for sending an SRS according to an embodiment of the invention.

In addition, the embodiment of the invention provides a communication system for sending an SRS, the special schematic structural diagram of which is shown in FIG. 7. The communication system includes a network side device 71 and a user equipment 72.

The network side device 71 is configured to determine a first frequency band required when the user equipment 72 sends the SRS, and determine a second frequency band which has a bandwidth less than that of the first frequency band; and The user equipment 72 is configured to send the SRS on each of the first frequency band and the second frequency band determined by the network side device 71, in a manner that the average interval for sending the SRS on the first frequency band is greater than the average interval for sending the SRS on the second frequency band.

In addition, the embodiment of the invention also provides a communication system for receiving an SRS. The communication system includes a network side device and a user equipment.

The network side device is configured to determine a first frequency band required when the user equipment sends the SRS, determine a second frequency band which has a bandwidth less than the bandwidth the first frequency band, monitor the SRS on the determined first frequency band and the determined second frequency band, and receive the SRS on the monitored frequency bands; and The user equipment is configured to send the SRS on each of the first frequency band and the second frequency band that are determined by the network side device, in a manner that the average interval for sending the SRS on the first frequency band is greater than the average interval for sending the SRS on the second frequency band.

Obviously, numerous modifications and variations can be made to the invention by those skilled in the art without deviating from the sprit and scope of the invention. Thus, if these modifications and variations of the invention fall into the scope of the claims of the invention and the equivalents thereof, the invention is intended to include these modifications and variations.

What is claimed is:

1. A method for sending a sounding reference signal, comprising:
determining a first frequency band required for sending the sounding reference signal, and determining a second frequency band which has a bandwidth less than that of the first frequency band; and
sending the sounding reference signal on each of the first frequency band and the second frequency band in a manner that an average interval for sending the sounding reference signal on the first frequency band is greater than an average interval for sending the sounding reference signal on the second frequency band, the sending comprising:
determining a first precoding matrix which is used to encode the sounding reference signal for assisting uplink transmission and a second precoding matrix which is used to encode the sounding reference signal for assisting downlink transmission;
encoding the sounding reference signal with each of the first precoding matrix and the second precoding matrix, to obtain a first sounding reference signal and a second sounding reference signal; and
sending the first sounding reference signal on the first frequency band, and sending the second sounding reference signal on the second frequency band.

2. The method according to claim 1, wherein sending the sounding reference signal on each of the first frequency band and the second frequency band in the manner that the average interval for sending the sounding reference signal on the first frequency band is greater than the average interval for sending the sounding reference signal on the second frequency band comprises:
receiving information for notifying that the sounding reference signal is to be sent on the first frequency band or for notifying that the sounding reference signal is to be sent on the second frequency band, with an interval for receiving the information for notifying that the sounding reference signal is to be sent on the first frequency band being greater than an interval for receiving the information for notifying that the sounding reference signal is to be sent on the second frequency band; and
sending the sounding reference signal on corresponding one of the frequency bands according to the received information.

3. The method according to claim 1, further comprising determining a sending period corresponding to the first frequency band, wherein:
sending the sounding reference signal on each of the first frequency band and the second frequency band comprises:
sending the sounding reference signal on the first frequency band at the sending period, and sending the sounding reference signal on the second frequency band when information for notifying that the sounding reference signal is to be sent on the second frequency band is received.

4. The method according to claim 1, further comprising determining a sending period corresponding to the second frequency band, wherein:
sending the sounding reference signal on each of the first frequency band and the second frequency band comprises:
sending the sounding reference signal on the second frequency band at the sending period, and sending the sounding reference signal on the first frequency band when information for notifying that the sounding reference signal is to be sent on the first frequency band is received.

5. The method according to claim 1, wherein sending the sounding reference signal on each of the first frequency band and the second frequency band comprises:
determining whether there exists an overlap between the time period over which the sounding reference signal is to be sent on the first frequency band and the time period over which the sounding reference signal is to be sent on the second frequency band;

determining an overlapped time period if there exists the overlap; and sending, within the overlapped time period, the sounding reference signal only on the first frequency band; or sending, within the overlapped time period, the sounding reference signal which is originally to be sent on the second frequency band within the overlapped time period, on the first frequency band in a manner of multiplexing the first frequency band.

6. The method according to claim 1, wherein the second frequency band is wider than a data transmission frequency band of a user equipment, and sending the sounding reference signal on the second frequency band comprises:

determining whether the user equipment is currently sending a demodulation reference signal by using the data transmission frequency band;

sending the sounding reference signal in a demodulation reference signal sequence on a position which is used for sending the demodulation reference signal or on a specified position in the demodulation reference signal sequence, if the user equipment is not currently sending the demodulation reference signal by using the data transmission frequency band;

extending a length of the demodulation reference signal sequence so as to cover the second frequency band, encoding the sounding reference signal in a manner of code division multiple access or frequency division multiple access or time division multiple access, and sending the encoded sounding reference signal in the extended demodulation reference signal sequence, if the user equipment is currently sending the demodulation reference signal by using the data transmission frequency band.

7. The method according to claim 1, wherein determining the first precoding matrix and the second precoding matrix comprises:

sending a third sounding reference signal;

receiving information on the first precoding matrix which is determined and sent according to the third sounding reference signal, and determining the first precoding matrix according to the information on the first precoding matrix; and determining the second precoding matrix according to a downlink sounding reference signal.

8. The method according to claim 7, wherein an average interval for sending the third sounding reference signal is greater than an average interval for sending the first sounding reference signal and is greater than an average interval for sending the second sounding reference signal; and sending the third sounding reference signal comprises:

sending the third sounding reference signal on a third frequency band, wherein the third frequency band contains the first frequency band and the second frequency band.

9. The method according to claim 7, wherein an average interval for sending the third sounding reference signal is greater than an average interval for sending the first sounding reference signal and is greater than an average interval for sending the second sounding reference signal; and sending the third sounding reference signal comprises:

sending the third sounding reference signal on each of a fourth frequency band and a fifth frequency band, wherein the fourth frequency band contains the first frequency band and the fifth frequency band contains the second frequency band.

10. The method according to claim 9, further comprising determining a first moment at which the first sounding reference signal and the third sounding reference signal are to be sent simultaneously, and determining a second moment at which the second sounding reference signal and the third sounding reference signal are to be sent simultaneously, wherein:

sending the first sounding reference signal on the first frequency band comprises sending the first sounding reference signal on the first frequency band, and temporarily stopping, at the first moment, the sending of the first sounding reference signal; and sending the second sounding reference signal on the second frequency band comprises sending the second sounding reference signal on the second frequency band, and temporarily stopping, at the second moment, the sending of the second sounding reference signal.

11. The method according to claim 1, wherein determining the first precoding matrix and the second precoding matrix comprises:

sending a third sounding reference signal;

receiving information on the first precoding matrix and information on the second precoding matrix, each of which is determined and sent according to the third sounding reference signal; and determining the first precoding matrix and the second precoding matrix respectively according to the information on the first precoding matrix and the information on the second precoding matrix.

12. A method for receiving a sounding reference signal, comprising:

determining a first frequency band required for sending the sounding reference signal and determining a second frequency band which has a bandwidth less than that of the first frequency band;

monitoring the sounding reference signal on each of the determined first frequency band and the determined second frequency band, wherein an average interval for sending the sounding reference signal on the first frequency band is greater than an average interval for sending the sounding reference signal on the second frequency band; and receiving the sounding reference signal on the monitored frequency bands, wherein the sounding reference signal received on the first frequency band is obtained by a user equipment through encoding the sounding reference signal with a first precoding matrix which is used to encode the sounding reference signal for assisting uplink transmission, and the sounding reference signal received on the second frequency band is obtained by the user equipment through encoding the sounding reference signal with a second precoding matrix which is used to encode the sounding reference signal for assisting downlink transmission.

13. A user equipment, comprising:

an encoder configured to obtain a first sounding reference signal by encoding a sounding reference signal with a first precoding matrix which is used to encode the sounding reference signal for assisting uplink transmission, obtain a second sounding reference signal by encoding the sounding reference signal with a second precoding matrix which is used to encode the sounding reference signal for assisting downlink transmission; and a sending unit, configured to send the first sounding reference signal on a first frequency band, and to send the second sounding reference signal on a second frequency band which has a bandwidth less than that of the first frequency band, in a manner that an average interval for sending the first sounding reference signal on the first frequency band is greater than an average interval for sending the second sounding reference signal on the second frequency band.

14. The user equipment according to claim 13, wherein the sending unit comprises:
    a receiving module, configured to receive information for notifying that the sounding reference signal is to be sent on the first frequency band or for notifying that the sounding reference signal is to be sent on the second frequency band, wherein an interval for receiving the information for notifying that the sounding reference signal is to be sent on the first frequency band is greater than an interval for receiving the information for notifying that the sounding reference signal is to be sent on the second frequency band; and
    a sending module, configured to send the sounding reference signal on corresponding one of the frequency bands according to the information received by the receiving module.

15. A network side device comprising a receiving unit, wherein the network side device is configured to:
    determine a first frequency band required for sending the sounding reference signal and determine a second frequency band which has a bandwidth less than that of the first frequency band;
    monitor the sounding reference signal on each of the first frequency band and the second frequency band, wherein an average interval for sending the sounding reference signal on the first frequency band is greater than an average interval for sending the sounding reference signal on the second frequency band; and
    receive, with the receiving unit, the sounding reference signal on the frequency bands,
    wherein the receiving unit is configured to:
        receive a first sounding reference signal on the first frequency band, wherein the first sounding reference signal is obtained by encoding the sounding reference signal with a precoding matrix which is used to encode the sounding reference signal for assisting uplink transmission; and
        receive a second sounding reference signal on the second frequency band, wherein the second sounding reference signal is obtained by encoding the sounding reference signal with a precoding matrix which is used to encode the sounding reference signal for assisting downlink transmission.

16. A system for sending a sounding reference signal, comprising a network side device and a user equipment, wherein:
    the network side device is configured to determine a first frequency band required for sending the sounding reference signal by the user equipment and to determine a second frequency band which has a bandwidth less than that of the first frequency band; and
    the user equipment is configured to obtain a first sounding reference signal through encoding the sounding reference signal with a first precoding matrix which is used to encode the sounding reference signal for assisting uplink transmission, to obtain a second sounding reference signal through encoding the sounding reference signal with a second precoding matrix which is used to encode the sounding reference signal for assisting downlink transmission, to send the first sounding reference signal on the first frequency band, and to send the second sounding reference signal on the second frequency band, in a manner that an average interval for sending the first sounding reference signal on the first frequency band is greater than an average interval for sending the second sounding reference signal on the second frequency band.

17. A system for receiving a sounding reference signal, comprising a network side device and a user equipment, wherein:
    the network side device is configured to determine a first frequency band required for sending the sounding reference signal by the user equipment, to determine a second frequency band which has a bandwidth less than that of the first frequency band, to monitor the sounding reference signal on the determined first frequency band and the determined second frequency band, and to receive the sounding reference signal on the monitored frequency bands; and
    the user equipment is configured to obtain a first sounding reference signal through encoding the sounding reference signal with a first precoding matrix which is used to encode the sounding reference signal for assisting uplink transmission, to obtain a second sounding reference signal through encoding the sounding reference signal with a second precoding matrix which is used to encode the sounding reference signal for assisting downlink transmission, to send the first sounding reference signal on the first frequency band, and to send the second sounding reference signal on the second frequency band, in a manner that an average interval for sending the first sounding reference signal on the first frequency band is greater than an average interval for sending the second sounding reference signal on the second frequency band.

\* \* \* \* \*